United States Patent
Krongauz et al.

(10) Patent No.: US 6,265,476 B1
(45) Date of Patent: Jul. 24, 2001

(54) RADIATION-CURABLE BINDER COMPOSITIONS HAVING HIGH ELONGATION AND TOUGHNESS AFTER CURE

(75) Inventors: Vadim V. Krongauz, Barlett; Michael G. Sullivan, Belvidere, both of IL (US); Stephen C. Lapin, Waterford, WI (US); Edward J. Murphy, Arlington Heights, IL (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/411,326

(22) Filed: Oct. 4, 1999

Related U.S. Application Data

(63) Continuation of application No. PCT/NL98/00201, filed on Apr. 8, 1998.
(60) Provisional application No. 60/045,707, filed on May 6, 1997, and provisional application No. 60/043,761, filed on Apr. 8, 1997.

(51) Int. Cl.$^7$ ............................. C08K 5/37; C08K 5/372; C08K 5/54
(52) U.S. Cl. ....................... 524/262; 526/301; 522/90; 522/96; 522/97; 528/30; 427/508; 427/515; 427/516; 385/123; 65/425; 524/81; 428/378; 428/441; 556/427; 556/458; 568/61; 568/21
(58) Field of Search ..................... 524/81, 262; 526/301; 522/90, 96, 97; 528/30; 427/515, 516; 385/123; 65/425; 428/378, 441; 556/427, 458; 568/61, 21

(56) References Cited

U.S. PATENT DOCUMENTS

| | | | |
|---|---|---|---|
| 4,524,169 | * 6/1985 | Wolff et al. | 524/263 |
| 5,426,166 | * 6/1995 | Usifer et al. | 526/301 |
| 5,509,942 | * 4/1996 | Dodge | 29/623.2 |
| 5,804,311 | * 9/1998 | Suwa et al. | 428/378 |
| 5,980,995 | 11/1999 | Linsenbardt et al. | 427/504 |

* cited by examiner

*Primary Examiner*—Robert Dawson
*Assistant Examiner*—Kuo-Liang Peng
(74) *Attorney, Agent, or Firm*—Pillsbury Winthrop, LLP

(57) ABSTRACT

Radiation-curable compositions, having high elongation at break and toughness after cure can include the following pre-mixture components:
a) a polymer, oligomer or monomer having at least one (meth)acrylate functional group;
b) an oligomer or monomer, exclusive of (meth)acrylate functional groups, having an ethylenically unsaturated functional group; and
c) an elongation promoter;

wherein the composition, after radiation-cure, has an elongation at break of at least about 200%. Glass substrates and optical fibers are coated with the radiation-curable composition. Monofilament fiber or a plurality of fiber filaments, such as sewing thread, are coated with the radiation-curable binder composition, which after cure, demonstrates high elongation at break.

30 Claims, No Drawings

RADIATION-CURABLE BINDER COMPOSITIONS HAVING HIGH ELONGATION AND TOUGHNESS AFTER CURE

This is a Continuation of: International Appln. No. PCT/NL98/00201 filed Apr. 8, 1998. This application claims the benefit of U.S. Provisional Application No. 60/043,761, filed Apr. 8, 1997 and 60/045,707, filed May 6, 1997.

FIELD OF THE INVENTION

The present invention relates to radiation-curable compositions, in particular, compositions which have unexpectedly high elongation and toughness after radiation-cure, useful as binding compositions for a variety of substrates.

BACKGROUND OF THE INVENTION

Radiation-curable binder compositions are used to create adhesion between two or more substrates. In addition to creating adhesion, binder compositions can contribute to the overall toughness of the bound substrates. Binder compositions which exhibit the property of high elongation at break can further contribute to the flexibility of the bound substrates; particularly when applied to substrates which alone are less flexible than the binder composition. The need for effective binder compositions in a wide variety of industries has been addressed in different ways depending upon the specific types of substrates which are bonded. For a wide variety of applications, binder compositions which exhibit strong adhesion, high durability and high elongation are most desired.

Binder compositions have a wide variety of uses in applications related to the binding of smooth surfaced substrates such as for example, glass substrates.

It is known that glass substrates can be weakened upon exposure to water. For example, moisture in air can cause weakening and the eventual breakage of glass. In particular, glass weakening may be accelerated under basic aqueous conditions. To prevent the destructive effects of moisture to glass substrates, a variety of polymeric coating compositions have been applied to a wide range of glass articles. The protective coating compositions can also act as an adhesive or binder composition to cement two separate glass substrates together. Radiation-curable compositions, whether used as coatings or adhesives are attractive because of fast cure speeds.

Coated and/or bonded glass articles include, but are not limited to, optical fibers (such as, for example, glass optical fibers), bottles, light bulbs, windows, safety glass (as used in automobiles and high-rise buildings), cemented compound optical lenses, and the like. Radiation-curable coatings which exhibit good binding characteristics are particularly important in optical fiber coating technology.

In addition to protecting and preserving the strength of the glass substrate, coatings can increase abrasion resistance of the glass substrate, protect the glass substrate from splintering if damaged, and in the case of coated glass optical fibers, improve glass substrate resistance to damage due to moisture and production methods.

Moisture, in addition to causing the weakening of glass substrates, can also cause polymeric coating compositions to break away or delaminate from the surface of the glass substrate. The delamination of a coating composition can result in direct exposure of the glass substrate to the harmful effects of moisture.

U.S. Pat. No. 5,000,541, issued to DiMarcello et al. teaches a method for hermetically sealing an optical fiber with carbon, which prevents water from contacting the optical fiber and thus prolongs the useful life of the optical fiber. Hermetic seals, however, severely limit production processes.

U.S. Pat. No. 4,849,462 issued to Bishop et al. teaches the incorporation of organofunctional silane into a coating composition to improve the adhesion between a coating composition for an optical fiber and the optical fiber, particularly in moist environments. The coating composition of Bishop does not teach the high elongation to break values of the present invention.

U.S. Pat. No. 5,502,145 issued to Szum discloses an optical fiber coating composition containing a hydrolyzable poly(siloxane) providing greater protection of the coated glass substrate from moisture damage. However, poly (siloxane) typically reduces adhesion of the composition.

Likewise, U.S. Pat. No. 5,214,734 issued to Inniss et al. teaches the incorporation of particulate silica in a polymeric coating composition to increase the fatigue resistance of an optical fiber or glass to moisture. However, the introduction of particulate matter into a coating composition as disclosed in the Inniss et al. patent can present problems such as scratching the pristine optical glass fiber, resulting in breakage at low tensile loads, a turbid coating composition, which has a tendency to gel, and other processing problems that are commonly encountered when working with particulate matter.

Further, many optical fiber coating compositions have other drawbacks that make them unsuitable for certain applications. For example, some of the compositions may be too expensive to use in the production of low cost optical fibers or glass objects.

In the field of optical glass lenses, extremely high precision is required in the bonding of two or more optical lens elements to form a single cemented compound lens. The quality of the cemented lens requires that the bond formed between the individual lens is durable, not easily degraded upon exposure to the environment and not subject to degradation over time.

In applications where the coating composition is bonded to large surfaces of glass substrate such as in the manufacture of safety glass the requirements for the binding composition may vary considerably. Safety glass, as used in automobile glass, skyscraper windows, or other such applications, can be formed as either a single coated glass substrate or multiple layers of glass sheets bonded together by an adhesive or binding composition. A major concern in the manufacture of safety glass is to use a coating composition which when bound to the surface of the glass substrate will exhibit strong adhesion, high durability and high elongation. Following a severe physical impact to safety glass the coated glass may break. It is desired that the coating composition or, in the case of multiple-layered bonded glass, the intermediate binder composition layer will remain bonded to the individual pieces of the broken glass and hold the broken pieces in close proximity to each other. It is the ability of the binding composition to undergo considerable elongation without breaking that keeps the broken glass from splintering and being scattered about in a hazardous manner.

U.S. Pat. No. 4,317,862 issued to Honda et al. teaches the use of photosensitive resins in binding compositions to provide a safety glass for use in vehicles. Prolonged effects of the environment and limited degrees of elongation detract from the effectiveness of binding compositions. Improved elongation of the binding composition is important to the improved safety of the bonded glass windows and articles produced.

An example of another major industrial area which requires the employment of binder compositions is the preparation of industrial sewing threads. Industrial sewing threads are utilized in numerous industrial applications and consumer products. For example, industrial sewing threads can be found in outdoor equipment such as tents, backpacks, sails, golf bags, and the like. Other products incorporating industrial sewing threads include shoes, carpets, rugs, automotive and aircraft upholstery, automotive safety bags, and the like. The durability, weatherability, flexibility and other characteristics of these products depend in large part upon the quality and nature of the industrial sewing thread. Industrial sewing threads are typically prepared from smaller fiber filaments or yarns. The individual filaments or yarns can be made of essentially any synthetic or natural material but are typically derived from, for example, various polymers such as nylons, polyesters, acetates, polyacrylonitriles, polyamides or aromatic polyamides such as KEVLAR from Du Pont de Nemours, E.I. & Co., or regenerated cellulose. The filaments and yarns can be wound, woven, or otherwise combined or integrated to form the larger industrial sewing thread fiber structure.

Individual fiber filaments or yarns can be bonded together with an adhesive, or binder composition, to form the thread. The binder composition creates adhesion between a significant number of individual fibrous structures and contributes to the overall toughness and flexibility of the sewing thread. Bonded sewing threads have several advantages including higher sewing rates, reduced time wasted due to thread break, increased thread abrasion resistance, and simpler twist of threads.

Heat-curable binder compositions are known which can be applied with use of volatile solvents and application of heat. However, this causes problems such as slow line speeds, energy costs for heating, and solvent emissions. Radiation-curable binder compositions, which do not employ volatile solvents and cure rapidly, may solve these and other problems. U.S. Pat. No. 5,409,740 discloses a dual-cure adhesive method which employs a resin composition which exhibits two curing mechanisms. The dual cure involves both a radiation cure (e.g., UV initiated radical polymerization of acrylate functional materials) and a moisture cure of isocyanate functional oligomers. This reference teaches that the moisture cure is indispensable. However, the moisture cure in particular makes this process unattractive because moisture cure requires time (e.g., 1–24 hr) to achieve good properties. Moreover, moisture cure can lead to inconsistent properties and undesirable high moisture contents.

U.S. Pat. No. 5,389,108 teaches that dyed materials can be exposed to ionizing radiation. However, radiation-curable materials are not disclosed. Other publications include U.S. Pat. No. 4,501,588, WO-A-94/25665 and EP-A-524,144, wherein radiation-curable compounds are used to achieve improved adhesion of coloring material to fibers. However, a binder for sewing thread is not provided.

In the articles, *J. Appl. Polym. Sci.* 1979, Vol. 23, No. 11, 3227–3242 and 3243–54, electron-beam curable compositions are disclosed. According to these articles, certain compounds can function in some cases to increase elongation. However, UV-curable compositions for binding industrial sewing thread are not disclosed.

It is an object of this invention to overcome disadvantages of prior art binder compositions and provide compositions which can be employed in the binding processes required for a wide variety of substrates to provide an outstanding balance of properties including, among others, elongation, toughness, secant modulus, and cure speed.

SUMMARY OF THE INVENTION

The present invention provides a radiation-curable composition comprising, the following pre-mixture components:

a) a polymer, oligomer or monomer having at least one (meth)acrylate functional group;

b) an oligomer or monomer, exclusive of (meth)acrylate functional groups, having an ethylenically unsaturated functional group; and c) an elongation promoter;

wherein the composition, after radiation-cure, has an elongation at break of at least 200%.

The present invention further provides a coated optical fiber comprising a radiation-cured coating formed from one of the above noted radiation-curable compositions.

The present invention further provides coated or bonded glass articles including, for example, automotive safety glass which resists splintering following breakage of the glass substrate or other multiple-layered glass substrates, wherein the article comprises a radiation-cured adhesive (or binder) formed from one of the above noted radiation-curable compositions.

The present invention further provides an industrial sewing thread comprising (1) a plurality of fiber filaments, yarns, or mixtures thereof, and (2) a radiation-cured binder (or coating) composition formed from one of the above noted radiation-curable compositions.

The present invention also provides a process for preparing a coated optical fiber and a coated sewing thread comprising, the steps of: coating said fiber with a composition formed from one of the above noted radiation-curable compositions.

Another object of the present invention is to provide a process for preparing a multi-layer glass article comprising, the steps of:

coating at least a portion of a first glass substrate with a one of the above noted radiation-curable compositions placing a second glass substrate in contact with the coated portion; and radiation curing the composition sandwiched between the first and second glass substrates, wherein said cured coating has an elongation at break of at least about 200%.

The present invention also provides a method for increasing the elongation of a radiation-curable coating composition for optical fibers which comprises incorporating a sulfur-containing elongation promoter compound into the composition before cure.

The present invention further provides an industrial sewing thread (and articles made therefrom, such as an automotive air safety bag) comprising (1) a plurality of fiber filaments, yarns, or mixtures thereof, and (2) a radiation-cured binder (or coating) composition formed from one of the above noted radiation-curable compositions.

The present invention also provides monofilament fibers, such as, for example, monofilament fishing line, coated with the binder formed from one of the above noted radiation-curable compositions.

The present invention also provides a method for preparing industrial sewing thread from filaments and a radiation-curable binder composition comprising the steps of binding filaments of the thread with a binder formed from one of the above noted radiation-curable compositions.

Surprisingly, it has been found that a radiation-curable composition can be formulated to be very tough, i.e. to have upon cure unexpectedly very high elongation in combination with reasonably high secant modulus and tensile strength, which allows the composition to be an outstanding binding material for a wide variety of substrates including, for example, optical fibers, glass substrates, and industrial sewing thread.

DETAILED DESCRIPTION OF THE INVENTION

The present invention is described in the context of widely varied applications, which demonstrate the superior characteristics of the binder/coating/adhesive composition of the present invention and this composition applied to, for non-limiting examples, optical fibers, glass substrates, and sewing threads.

Optical fiber coatings can be formed as single or dual primary coatings; dual coatings having an inner primary coating of relatively low modulus range and an outer primary coating of relatively high modulus range. Optical fibers can further be provided with coatings which comprise ink layers, to impart color to a particular optical fiber, or tertiary coatings to add additional protection. The radiation-curable composition of the present invention can be adapted to any of these optical fiber coating requirements in addition to being used as compositions for ribbon matrix materials and bundling materials used as binder materials in optical fiber applications.

Smooth surfaced substrates, such as for optical fibers, to include, for example, glass or thermoplastic optical fibers, can be bound by the radiation-curable compositions of the present invention. The invention is not limited by the type of substrate coated or bonded together. Automobile safety glass which resists splintering, cemented compound optical lenses comprising multiple-layered lenses bonded together, and other bonded or coated smooth surfaced substrate articles are within the contemplation of the invention.

The radiation-curable binder compositions according to the present invention provide optical fibers which unexpectedly can withstand high stresses during processing, subsequent installation and handling.

In other industries, for example, the manufacture of sewing threads, or other fibrous products, the binder composition of the present invention can provide superior binding to substrates. Various fiber-like structures can be bound by the radiation-curable compositions of the present invention including fibrous yarns and filaments. The invention is not limited by the type of fibrous structure bound together. Suitable fiber filaments or yarns can comprise any fiber made of any type of material capable of being processed, wound or woven into larger thread structures or monofilaments. The fiber filaments can be, for example, polymeric materials such as nylons, polyesters, acetates, polyacrylonitriles, polyamides or aromatic polyamides such as KEVLAR from Du Pont de Nemours, E. I. & Co., or regenerated cellulose, and blends thereof. Preferred polymeric fiber filaments include nylon and polyester fiber filaments.

Techniques for forming fiber bundles from a plurality of fiber filaments are known in the art. The fiber filaments or yarns can be integrated by winding, weaving, spin-extruding, laying or otherwise arranging the fiber-like structures adjacent to one another in the form of a fiber bundle which is useful as a rope or thread. Continuous filament threads can be produced.

In addition, thread encapsulation can be carried out with the binder of the present invention. Encapsulation can increase abrasion resistance and prevent filaments from untwisting or splitting out from the thread.

Exemplary methods for thread construction and production are disclosed in, for example, *The Technology of Thread & Seams*, $3^{rd}$ Ed. (produced by Coats Marketing, London 1996), the complete disclosure of which is incorporated by reference. Conventional practice can be used.

The fiber filaments are preferably wound to form a fiber bundle having a diameter between about 50 mm and about 1 mm, and preferably, between about 100 mm and about 0.5 mm. Filament diameter can be, for example, from about 10 mm to about 100 mm, and preferably, from about 20 mm to about 50 mm. Monofilament fibers may be used individually or in a thread and may be treated with a binding composition of the present invention.

The radiation-curable binder compositions according to the present invention provide sewing threads which unexpectedly can withstand high stresses during processing, including the processes for making thread and the processes for making articles from the thread. High speed thread production can be achieved.

Important characteristics of the thread and/or binder composition include:

ply adhesion, which is the adhesion between the filaments;

lack of flaking, which means binder material does not detach from the thread during sewing;

lack of "gumming up", which means lack of build-up of binder at the needle;

bond pick up, which means the minimum amount of binder needed to achieve good properties; flexibility; and low alcohol extraction loss.

The binder of the present invention provides ply adhesion generally higher than about 10 g, and preferably higher than about 20 g, and more in particular, higher than about 30 g.

The binder of the present invention provides minimal or no flaking or gumming at high sewing speed.

The amount of binder composition is preferably minimized. The amount of binder generally can be lower than about 15 wt. % relative to the weight of filaments. More preferably, the amount of the binder can be about 4 wt. % to about 12 wt. % relative to the weight of the filaments. The amount of binder can be adjusted depending on the mechanical properties of the binder.

The radiation-curable composition comprises at least one radiation-curable polymer, oligomer and/or monomer, at least one oligomer/monomer or reactive diluent, at least one optional photoinitiator, and at least one elongation promoter.

Preferably, a photoinitiator is present if cure is effected by ultraviolet light, and preferably, at least two monomer diluents are present.

The radiation-induced cure reaction is preferably a free-radical polymerization. Hence, oligomer and diluent components, as well as photoinitiator, are preferably selected to effect cure by a free-radical mechanism.

The oligomer can comprise an oligomer backbone, two radiation-curable groups, and linking groups which link the radiation-curable groups to the oligomer backbone. The oligomer preferably has a linear structure. The oligomer can comprise block or random copolymeric structures. Although, polymer and monomers having functionality similar to the oligomers noted herein may be employed for these compositions, oligomers comprising urethane linkages and (meth)acrylate radiation-curable groups are preferred, with oligomers having two (meth)acrylurethane groups being particularly preferred, ("urethane acrylate oligomer", "(meth) acrylurethane oligomer" or "acrylourethane oligomer").

The acrylate oligomer can be selected from the group consisting of acrylourethane oligomers, polyester acrylate oligomers, polyether acrylate oligomers and mixtures thereof. The acrylourethane oligomer can be any of the conventional acrylourethanes prepared by reacting an olefinically unsaturated compound with an isocyanate-functional urethane formed by the reaction of an excess of a polyisocyanate with a polyol selected from the group consisting of polyether, polycarbonate, polyolefin, polyester, polycaprolactone and polyetherester polyols. In a preferred embodiment of the present invention, the composition is substantially free of epoxy acrylate oligomers.

The polyol used as the backbone of the urethane oligomer preferably is a polyether, polyolefin, polycarbonate or mixture of these. Suitable polyethers include polytetrahydrofuran. (PolyTHF), PolyTHF comprising methyl-THF as a comonomer, poly-1,2-propylene-glycol, poly-1,3-propyleneglycol, alkoxylated bisphenol-A and the like. Suitable polycarbonates can be prepared from, for example, 1,6-hexanediol and diethylcarbonate. Suitable polyolefins preferably comprise hydrogenated polybutadiene, and in particular, 1,2- and 1,4 copolymerized butadiene. Other polyols to be used as a backbone include polyesters like adipic acid-NPG polymers or polycaprolactone polymers.

The olefinically unsaturated compounds employed for the preparation of the present acrylourethane oligomers may be monomeric or polymeric and are characterized by the presence of a single moiety which can react with isocyanate such as an active hydrogen group. Preferably, the active hydrogen group is hydroxy. Illustrative of unsaturated additional-polymerizable monomeric organic compounds having a single isocyanate-reactive active hydrogen group are 2-hydroxyethyl acrylate, 2-hydroxyethyl methacrylate, 2-hydroxpropyl acrylate, 2-hydroxypropyl methacrylate, N-hydroxymethyl acrylamide, N-hydroxmethyl methacrylamide, diethylene glycol monoacrylate, diethylene glycol monomethacrylate, glycerine dimethacrylate, dimethylol propane dimethacrylate, reaction products of polyester glycols of acrylic or methacrylic acid and the like.

The isocyanate-functional urethanes for preparing the present acrylourethane oligomers may be formed by the reaction of an excess of a polyisocyanate with a polyol. The polyisocyanate compounds which are employed in forming the acrylourethane oligomers in accordance with the present invention can be any organic isocyanate compound having at least two free isocyanate groups. Included within the purview of suitable polyisocyanates are aliphatic, cycloaliphatic, and aromatic polyisocyanates, as these terms are generally interpreted in the art. Thus, it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, toluene-2, 4-diisocyanate, 2,2,4-trimethylhexamethylene-1, 6-diisocyanate, hexamethylene-1,6-diisocyanate, diphenylmethane-4,4'-diisocyanate, triphenylmethane-4,4', 4"-triisocyanate, polymethylene, polyphenylisocyanate, m-phenylene diisocyanate, p-phenylene diisocyanate, 2,6-toluene diisocyanate, 1,5-naphthalene, diisocyanate, naphthalene-1,4-diisocyanate, diphenylene-4,4'-diisocyanate, 1,4-cyclohexylene dimethylene diisocyanate, xylene-1,4-diisocyanater xylene-1,3-diisocyanater cyclohexyl-1,4-diisocyanate, 4,4'-methylene-bis (cyclohexyl-1,4-diisocyanate), 3,3'-dimethyldiphenylmethane-4,4'-diisocyanate, isophorone diisocyanate, m-tetramethyl xylene diisocyanate, the product obtained by reacting trimethylol propane and 2,4-toluene diisocyanate in a ratio of 1:3, and the like. The diisocyanate compounds are preferred, with isophorone diisocyanate being a preferred example.

The polyol used to prepare the urethane oligomer generally has a molecular weight of about 200 g/mol to about-5,000 g/mol, and preferably, about 500 g/mol to about 4,000 g/mol, and more preferably, about 1,000 g/mol to about 3,000 g/mol. The urethane oligomer with radiation curable groups generally has a number average molecular weight of about 1,000 g/mol to about 10,000 g/mol, and preferably, about 1,500 g/mol to about 5,000 g/mol. Suitable syntheses of urethane oligomers are disclosed in, for example, U.S. Pat. Nos. 5,336,563 and 5,409,740 which are incorporated by reference. Mixtures of oligomers can be used.

The radiation-curable composition can comprise about 10 wt. % to about 90 wt. %,, and preferably, about 20 wt. % to about 90 wt. %, and more preferably, about 30 wt. % to about 90 wt. %, and even more preferably, about 50 wt. % to about 90 wt. % of radiation--curable oligomer.

A reactive diluent system, or monomer diluent system, is employed in combination with the radiation--curable oligomer to define the properties, both before and after cure, of the compositions of this invention. In a preferred embodiment of the present invention, the reactive diluent system employed and the radiation-curable oligomer are free of silicone groups.

The reactive diluent system, in particular, appears to function with the elongation promoter component to provide high elongation together with sufficient cure. Suitable reactive diluent systems comprise at least one ethylenically unsaturated addition-polymerizable monomer which is copolymerizable with the radiation-curable oligomer upon exposure to radiation.

One aspect of this invention is that the reactive diluent system includes at least one first type of monomer diluent which comprises acrylate or methacrylate unsaturation, and further includes at least one second type of monomer diluent which comprises non-acrylate and non-methacrylate vinyl unsaturation. In particular, the second monomer diluent is preferably a compound comprising an I-vinyl functional. group. Although the compositions preferably comprise the first type of diluent, this first type of diluent is optional provided a urethane acrylate oligomer is present in the composition. However, the second type of diluent is believed necessary to achieve the advantages of the present invention.

The reactive diluent system can comprise mono-, di-, tri-, and higher functional diluents to the extent that high elongation can be achieved. Functionality can be selected to achieve sufficiently high elongation. The molecular weight of the diluent is preferably low enough to allow it to be a liquid at room temperature, and in general, is less than about 1,000 g/mol, and preferably, less than about 750 g/mol. Mixtures of diluents can be used.

Particularly preferred reactive diluents of the first type are unsaturated addition-polymerizable monofunctional and polyfunctional acrylic monomers, with monofunctional being particularly preferred. Examples of the first type of diluent include isobornyl acrylate (IBOA), phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxy-ethoxy) ethyl acrylate, n-lauryl acrylate, 2-phenoxyethyl acrylate, glycidyl, methacrylate, glycidyl acrylate, acrylated methylolmelamine, and 2-(N,N-diethylamino)-ethyl acrylate. A preferred example is a fully saturated bicyclic acrylate such as, for example, isobornyl acrylate.

Examples of polyfunctional acrylic monomers include neopentyl glycol diacrylate, alkoxylated neopentyl glycol diacrylate, ethylene glycol diacrylate, hexylene glycol diacrylate, diethylene glycol diacrylate, tripropylene glycol diacrylate, tetraethylene glycol diacrylate, pentaerythritol di-, tri-, tetra-, or penta-acrylate, trimethylolpropane triacrylate, alkoxylated trimethylolpropane triacrylate which contains from 2 to 14 moles of either ethylene or propylene oxide, triethylene glycol diacrylate, tetraethylene glycol diacrylate, polyethylene glycol diacrylate, any corresponding methacrylates thereof, and combinations thereof.

The second type of reactive diluent comprises vinyl groups other than acryl.ate and methacrylate. The second type of diluent is preferably able to form thioether linkages with sulfur-containing compounds during radiation-cure. Thioether linkages can form by, for example, thiol-ene reactions. In particular, it may be desirable to have thioether linkages form as a result of reaction of the second type of diluent with the elongation promoter upon exposure to radiation. Aromatic unsaturation generally is less suitable for forming thioether linkages during radiation cure. A suitable radiation-curable group for this second type of diluent is, for example, N-vinyl, vinyl-ether, vinylester or allyl, with monofunctional monomers being preferred. N-vinyl compounds are particularly preferred.

Suitable examples of this second type of diluent include N-vinylformamide (NVF), adducts of NVF with diisocyanates such as toluene diisocyanate and isophorone diisocyanate, derivatives of N-vinylformamide, N-vinylcaprolactam, N-vinylpyrrolidone, butyl-vinylether, 1,4-butyl-divinylether, dipropyleneglycol-divinylether, the vinylester of acetic acid, lauryl acid, dodecanoic acid or cyclohexylcarboxylic acid, adipic acid, glutaric acid or the like, triallylisocyanurate, diallylphthalate, butyl-allyl-ether and the like. Monofunctional diluents are preferred. Particularly, suitable examples include N-vinyl pyrrolidone, N-vinyl caprolactam, and N-vinyl formamide, with N-vinyl formamide being particularly preferred as the second type of monomer diluent.

The reactive diluent system of the radiation-curable composition can be present from about 10 wt. % to about 90 wt. %, and preferably, from about 10 wt. % to about 80 wt. %, and more preferably, from about 10 wt. % to about 70 wt. %, and still more preferably, from about 10 wt. % to about 50 wt. % of the total composition. Of the reactive diluent system present in the composition, the second type of diluent, i.e., the non-acrylate, non-methacrylate reactive diluent, may be present in an amount of about 3 wt. % to about 30 wt. %, preferably, from about 6 wt. % to about 20 wt. %, and more preferably less than 14 wt. % of the total composition with the remainder of the reactive diluent system being composed of an unsaturated addition-polymerizable acrylic monomer or mixtures thereof, with monofunctional (meth)acrylate monomers being particularly preferred. The second type of diluent appears to enhance cure speed and provide for a suitable cure.

The radiation-curable composition further comprises an elongation promoter which can be a sulfur-containing compound, and preferably, an aliphatic sulfur-containing compound. In this compound, the sulfur atom is preferably bonded to the carbon atom of an aliphatic group. Mixtures of elongation promoters can be used. The sulfur-containing elongation promoter preferably does not generate odor problems.

In the present invention, "elongation promoter" means an additive for the radiation-curable composition wherein elongation of the corresponding radiation-cured composition is substantially increased by inclusion of the elongation promoter in relatively low concentrations of less than about 10 wt. %. For example, elongation increases of more than 100 percentage units, and even more than 200 percentage units, have been observed in radiation-cured compositions when the corresponding radiation-curable composition further comprises the elongation promoter. Preferably, elongation can be increased 1.5 times, and more preferably doubled, and even more preferably tripled upon addition of the elongation promoter under suitable conditions. The elongation promoter preferably has a molecular weight of less than about 1,000 g/mol, and more preferably, less than about 750 g/mol, and more preferably, less than about 500 g/mol.

In preferred embodiments, the desirable property of high elongation is combined with other advantageous properties such as suitable secant modulus, tensile strength, and cure speed. For example, to achieve the high elongation effect but yet maintain fast cure speed, the elongation promoter may need to function together with other ingredients in the composition such as the second type of reactive diluent and a fast cure speed photoinitiator. In some cases, the elongation promoter may also function as a chain transfer agent which may tend to slow cure speed. A suitable balance between fast cure speed and high elongation can be achieved for a particular application by selecting the components of the composition and their amounts including the type and amount of elongation promoter.

Although the present invention is not limited by theory, it is believed that the composition can be cured effectively to yield high toughness binder material if the sulfur-containing elongation promoter is able to react with, copolymerize with, or otherwise interact with the second type of monomer diluent which is not an acrylate or methacrylate, upon exposure to radiation. The sulfur-containing elongation promoter preferably is able to participate in free-radical reactions during cure. Free-radical cure is induced by the application of radiation such as UV light, but cure may also be induced, at least to some extent, by the heat generated by cure and resulting from the radiation source (e.g., hot UV lamps). Hence, thermal cure effects may be important for some binder compositions.

Several embodiments for the elongation promoter have been found to be suitable. For example, in a first embodiment, the elongation promoter can be a substantially or wholly aliphatic compound comprising one or more aliphatic sulfide or mercapto (thiol) groups. In this embodiment, pqlysulfide groups can also be present: in the compound. In a second embodiment, the elongation promoter can be a substantially or wholly aliphatic compound comprising aliphatic polysulfide groups, but not comprising mercapto groups. Wholly aliphatic compounds are preferred. Compounds are preferred wherein sulfur is bonded directly to a carbon atom of an aliphatic group such as, for example, an alkyl type of group.

Preferred elongation promoter compounds include those wherein the sulfur atom such as, for example, from a mercapto group, is bound directly to a carbon atom of an aliphatic group such as, for example, an alkyl group.

In all embodiments, whether or not mercapto group is present, the elongation promoter preferably comprises silane linkages (e.g., —Si—O—R) which can hydrolyze with surface moisture and interact with and react with hydroxyl-containing surfaces. Preferably, hydrolyzable silane linkages of the type, —Si(OR)$_3$ are present.

In the first embodiment, the elongation promoter comprises at least thio group, for example a mercapto or sulfide group and, preferably, an aliphatic mercapto or sulfide group. Compounds comprising a plurality of mercapto or sulfide groups (polythio) can be used including di- and tri-mercapto compounds. Such compounds may be active in so-called thiol-ene reactions. However, compounds comprising a single mercapto or disulfide group are preferred.

If a silane group is also present, a hydrocarbon spacer can link the mercapto or sulfide group with the silane groups. For example, the elongation promoter can be represented by the structure H—S—R—Si(OR')$_3$ wherein R is a $C_3$–$C_{12}$ hydrocarbon spacer group such as propyl, butyl, pentyl, hexyl, and the like, and R' is selected to allow the Si—OR' linkage to be hydrolyzable and reactive with moisture. For example, OR' can be an alkoxy group such as methoxy, ethoxy, or propoxy, or an alkyleneoxy group such as methoxyethoxy. In this embodiment, the elongation promoter preferably is a silane coupling agent such as a mercaptosilane compound such as, for example, γ-mercaptopropyltrimethoxysilane or γ-mercaptopropyltriethoxysilane.

Although the mercapto elongation promoter may preferably comprise at least one silane group, the elongation promoter can be an aliphatic type of mercapto compound, including mercapto chain transfer agents, which do not have silane functional group. Suitable examples include alkanethiol compounds, including $C_5$–$C_{30}$, and preferably $C_5$–$C_{20}$, alkanethiol compounds. Examples include 1-pentanethiol, 1-hexanethiol, 1-heptanethiol, 1-octanethiol, 1-decanethiol, 1-dodecanethiol, 1-hexadecanethiol, 1-octadecanethiol, cyclohexanethiol, eicosanethiol, docosanethiol, tetracosanethiol, hexacosanethiol, octacosanethiol, and the like. A preferred example is t-dodecyl mercaptan (isomer mixture).

If the elongation promoter does not comprise silane group, the binder composition can comprise another component which comprises hydrolyzable silane group. For example, the binder composition could further comprise a vinyl silane compound or an acrylate silane compound.

The sulfur-containing, aliphatic elongation promoter can further comprise other functional groups such as, for example, ester groups. Hence, suitable examples also include methyl thioglycolate, methyl-3-mercaptopropionate, ethyl thioglycolate, butyl thioglycolate, butyl-3-mercaptopropionate, isooctyl thioglycolate, isooctyl-3-mercaptopropionate, isodecyl thioglycolate, isodecyl-3-mercaptopropionate, dodecyl thioglycolate, dodecyl-3-mercaptopropionate, octadecyl thioglycolate, octadecyl-3-mercaptopropionate, thioglycolic acid, 3-mercaptopropionic acid, and the like.

Compounds comprising multiple mercapto groups include trimethylolpropane tris-3-mercaptopropionate. Additional compounds comprising a plurality of mercapto groups include the mercaptoalkyl-containing compounds of U.S. Pat. No. 5,302,627, which is hereby incorporated by reference.

In a further embodiment, the elongation promoter can be a polysulfide compound which does not comprise a mercapto functional group. In some applications, mercapto compounds may be undesirable if high elongation can still be achieved. Di-, tri-, tetra-, penta-, hexa-, hepta-, octa-, nona-, and higher polysulfide compounds can be used. Hence, for example, the elongation promoter can also be a disulfide compound which can be prepared by coupling of the elongation promoter thiol compound. In this embodiment, the polysulfide compound preferably comprises silane groups. Exemplary of polysulfide compounds comprising at least one silane group are the Ω,Ω'-bis(trialkoxysilylalkyl)polysulfides disclosed in, for example, U.S. Pat. No. 5,489,701 which is incorporated by reference. A preferred example of such a polysulfide compound is bis(3-triethoxysilylpropyl)-tetrasulfide.

The radiation-curable composition comprises, as a premixture ingredient, about 0.5 wt. % to about 10 wt. %, preferably, about 1 wt. % to about 8 wt. %, more preferably, 1 wt. % to about 6 wt. % of the elongation promoter. In one aspect of the present invention, relatively larger amounts of elongation promoter can be used to promote very high elongation. In this embodiment, the radiation-curable composition comprises 5 wt. % to 8 wt. % elongation promoter, and preferably, 6 wt. % to about 8 wt. %. It has unexpectedly been found that even with such a large amount of elongation promoter, high cure speeds can yet be achieved particularly when the composition comprises a fast cure speed photoinitiator such as L,UCIRIN TPO (BASF).

The high elongation effect has been observed with a variety of oligomer and diluent combinations. It was unexpected that the effect would be applicable to a large number of combinations. A particularly suitable composition comprises a combination of pre-mixture ingredients N-vinyl formamide diluent and mercaptopropyltriinethoxy silane elongation promoter. Although the present invention is not limited by theory, these ingredients appear to be capable of forming some type of charge transfer complex upon radiation exposure.

The radiation-curable material may optionally contain one or more photoinitiators to catalyze or accelerate cure by exposure to ultraviolet radiation. If the radiation-curable material is cured by exposure to electron beam radiation, a photoinitiator is typically not utilized. However, UV cure is preferred over electron beam cure.

The photoinitiator can be any of the known photoinitiators such as benzophenone, benzoin, acetophenone, benzoin methyl ether, Michler's ketone, benzoin butyl ether, xanthone, thioxanthone, propiophenone, fluorenone, carbazole, diethoxyacetophenone, the 2-, 3- and 4-methylacetophenones and methoxy-acetophenones, the 2- and 3-chloroxanthones and chlorothioxanthones, 2-acetyl-4-methylphenyl acetate, 2,2'-dimethoxy-2-phenylacetophenone, benzaldehyde, fluorene, anthraquinone, triphenylamine, 3- and 4-allyl-acetophenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert.butylbenzophenone, isobutyl ether-benzoic acetate, benzil benzilic acid, amino benzoate, methyl blue, 2,2-diethoxyacetophenone, 9,10-phenanthrenequinone, 2-methyl anthraquinone, 2-ethyl anthraquin.one, 1-tert.butylanthraquinone, 1,4-naphthaquinone, isopropylthioxanthone, 2-isopropylthioxa.nthone, 2-methylthioxanthone, 2-decylthioxanthone, 2-dodecylthioxanthone, 2-methyl-1,[4-(methyl thio)phenyl]-2-morpholinopropanone-1, combinations thereof and the like. The fast curing phosphine oxide photoinitiators such as LUCIRIN TPO are preferred. Mixtures of photoinitiators are desirable to achieve good through cure.

The radiation-curable compositions can cure well even in the presence of oxygen. Hence, in using the compositions for binders for thread, oxygen need not be substantially excluded during thread preparation, which is a major advantage.

The optional photoinitiator or combination of photoin.itiators is typically utilized in an amount ranging from about 1 to 10 wt. %, preferably from about 2 to 5, percent by weight of the radiation-curable material.

The radiation-curable binding composition typically is a liquid at room temperature with a viscosity of between about 200–10,000 cps.

The composition can be applied to a fiber filament bundle by conventional methods such as by spraying, dipping, or passing the fiber bundle through a Kiss roll applicator as is known in the art. Other methods for coating fibers or threads with adhesive compositions or coating known in the art may also be utilized in the present invention.

The polymerization of the radiation-curable binder composition can be initiated by exposing the coated fiber bundle to any source or actinic radiation at a wavelength within the ultraviolet or visible spectral regions so long as that wavelength overlaps the absorption spectrum of any photoinitiator being utilized. Suitable sources of radiation include mercury, xenon, carbon arc and tungsten filament lamps, sunlight etc. Exposures may be from less than about 1 second to 1 minute or more depending upon the amounts of particular polymerizable materials and photoinitiators being utilized and depending upon the radiation source and distance from the source. The suitable exposure will vary depending on the particular production process. However, in general, the exposure to UV/VIS light generally is between about 0.2 and about 2.0(J/cm$^2$, and more in particular between about 0.5 and about 1.5 J/cm$^2$.

If radiation curable material is polymerized by exposure to electron beam irradiation, a dosage is used typically ranging from less than about 1 megarad to about 100 megarads or more, preferably ranging from about 2 to about 10 megarads. However, electron beam cure is not preferred over UV cure. Damaging affects of electron beams may interfere with the desired good mechanical properties.

Generally speaking, the rate of polymerization increases with increasing amount of photoinitiator at a given light exposure or electron beam irradiation and also increases with increasing light intensity or electron dosage at a given level of photoinitiator. The use of thermal energy during or after exposure to a radiation source will also generally accelerate the curing reaction, and even a moderate increase in temperature may greatly accelerate cure rate. In any event, the overall energy required to effectuate cure of the polymerizable material of the present invention is significantly less than the amount of energy required to fully cure conventional solvent based adhesive compositions applied to fiber bundles.

Conventional additives such as adhesion promoters, for example silane-containing adhesion promoters, lubricants and/or the like can be employed in the compositions and/or production processes of the present invention to the extent they do not adversely affect the effect achieved by the present invention.

If necessary, the radiation-curable binder composition can be colored by colorants, dyes, pigments, and mixtures thereof. Conventional colorants can be used such as, for example, copper phthalocyanine blue (Prussian Blue). Yellow, red, blue, green, violet, orange, and the like are suitable colors. Any known colorant can be used to the extent that the advantages of the invention are achieved.

The mechanical properties of the composition, after cure, can be adapted to match those of the filaments and thread. Hence, elongation and flexibility can be controlled by selecting the composition ingredients and their amounts in view of the type of application. In particular, this can be controlled by selecting the type and amount of elongation promoter. In addition, if tensile strength of the cured binder composition is relatively low, thicker application of binder can be used to compensate.

After radiation-cure, the composition preferably has an elongation at break of at least about 200%, and more preferably, at least about 400%, and even more preferably, at least about 500%. Elongation of over 800%, and more than 1,000%, and even more than 1,200% can be achieved with use of certain elongation promoters. These selected elongation promoters can be termed "hyper elongation promoters" and are preferred when a maximum elongation is required. There is no particular upper limit to elongation, but it appears that it may be difficult to achieve elongation of more than about 2,000%, and in particular, more than about 3,000%.

After radiation-cure, tensile strength of the composition can be greater than about 3 MPa, and preferably greater than about 10 MPa, and more preferably greater than about 20 MPa, and even more preferably, greater than about 25 MPa. Increased thickness can be used to compensate for relatively low tensile strength in particular for binding industrial thread. There is no particular upper limit on the tensile strength, but it appears that tensile strength of more than about 35 MPa, and in particular, more than about 45 MPa would be difficult to achieve.

After radiation-cure, secant modulus of the composition preferably is less than about 100 MPa, and more preferably, less than about 85 MPa, and more preferably, less than about 70 MPa. Secant modulus can be greater than about 3 MPa, and preferably at least about 5 MPa, and more preferably, at least about 10 MPa.

After radiation cure, the compositions of the present invention may have dry adhesion above 300, more typically between 600–5000, preferably more than 1000 g/inch of width and/or a wet adhesion above 150, more typically between 450–4000 g/inch, preferably above 750 g/inch of width.

The ratio of the components in the radiation-curable composition of the present invention should be introduced in a range such that the total alcohol extraction value of the cured composition does not exceed 8 wt. %. Preferred radiation-curable compositions of the present invention are those which have, after cure, an alcohol extraction value of not more than 5 wt. %.

A suitable balance of mechanical properties can be achieved for a given application. For example, in general, increasing the amount of elongation promoter will increase elongation but decrease secant modulus and tensile strength. However, the magnitude of these effects may vary depending on the elongation promoter and the composition. For example, it has been found that if the elongation promoter is y-mercaptopropyltrimethoxy silane: (1) elongation increases steadily when the elongation promoter amount increases from 0 to 6 wt. %, but (2) tensile strength and secant modulus are relatively constant when the amount of elongation promoter increases from 0 to 3.5 wt. %, but then these values fall off when the amount is increased above 3.5 wt. % to 6 wt. %.

Compositions can be prepared which, after cure, have the following combination of tensile properties: elongation of more than about 600%, tensile strength of more than about 10 MPa, and secant modulus of less than about 100 MPa; and more preferably, elongation of more than about 600%, tensile strength of more than about 25 MPa, and secant modulus of less than about 80 MPa.

The following non-limiting examples are provided to further illustrate the invention.

EXAMPLES

Example 1 and Comparative Experiments A–C

Four radiation-curable binder compositions were prepared by mixing the following pre-mixture ingredients according to Table I (wt. %) by conventional methods. The radiation-curable binder compositions were coated at 150 mm thickness and cured with UV light (1 J/cm$^2$). Mechanical properties were measured by conventional methods (Table I).

TABLE I

| COMPONENT | 1 | A | B | C |
|---|---|---|---|---|
| CN973J75*** (Sartomer) aromatic urethane acrylate oligomer | 77.7 | 70.0 | 79.2 | 80 |
| N-vinylformamide | 11.6 | | 11.9 | 12 |
| Isobornyl acrylate | 3.9 | 6.5 | 3.96 | 4 |
| LUCIRIN TPO (BASF) | 3.9 | 4 | 3.96 | 4 |
| γ-mercaptopropyltrimethoxysilane | 2.9 | | | |
| vinyl caprolactam | | 12 | | |
| tetrahydrofurfuryl acrylate | | 7.5 | | |
| IRGACURE 184 (Ciba-Geigy) | | | 0.3 | |
| DC 57 (silicone) | | | 0.69 | |
| elongation (%) | 598 | 323 | 349 | 328 |
| secant modulus (MPa) | 81 | 38 | 106 | 110 |
| tensile strength (MPa) | 29 | 21 | 27 | 22 |

***CN973J75 is purchased as a mixture of oligomer and about 25% IBOA

With use of radiation-curable binder compositions of example 1 and of experiments A, B and C, flexible nylon industrial sewing threads were made by known methods. For the composition of example 1, according to the present invention, minimal or virtually no flaking or gumming was observed at line speeds of 50 meters per minute (mpm) up to 300 mpm. Bond pick-up values (%) varied with 5–7% being typical. Ply adhesion of about 40 g was found for line speeds up to 100 mpm, and fell to about 25 g as line speed was increased to 300 mpm. Use of both air and nitrogen atmospheres was also explored, and good cure could be achieved with both. Production speed of up to 300 mpm, and even 500 mpm, could be achieved.

The performance of the radiation-curable binder, 1, exceeded that of a commercially-used solvent-based polyamide binder composition (non-radiation-curable). Also, performance for composition of example 1 exceeded that for compositions of comparative experiments A, B and C wherein flaking was found.

The cure speed for the composition of example 1 was measured by FT-IR measurements. In particular, the rate at which acrylate unsaturation versus vinyl, non-acrylate unsaturation were reacted during cure was monitored. This showed that the radiation-curable composition was relatively fast curing. Hence, both good cure speed and high elongation (after cure) could be achieved from the same composition.

Example 2 and Comparative Experiments D–H

A series of radiation-curable formulations were prepared by conventional methods according to Table II (wt. %) to determine the effect of a silane additive on elongation. The data demonstrated that y-mercaptopropyltrimethoxysilane alone among these silanes functioned as an elongation promoter.

TABLE II

| Component | D | 2 | E | F | G | H |
|---|---|---|---|---|---|---|
| CN966J75*** | 80.0 | 77.7 | 77.7 | 77.7 | 77.7 | 77.7 |
| NVF | 12 | 11.6 | 11.6 | 11.6 | 11.6 | 11.6 |
| IBOA | 4 | 3.9 | 3.9 | 3.9 | 3.9 | 3.9 |
| LUCIRIN TPO (BASF) | 4 | 3.9 | 3.9 | 3.9 | 3.9 | 3.9 |
| γ-mercapto propyl trimethoxy silane | | 2.9 | | | | |
| methyl trimethoxy silane | | | 2.9 | | | |
| phenylamino propyl trimethoxy silane | | | | 2.9 | | |
| phenyl trimethoxy silane | | | | | 2.9 | |
| n-octadecyl trimethoxy silane | | | | | | 2.9 |
| elongation (%) | 328 | 598 | 322 | 312 | 343 | 260 |
| tensile strength (MPa) | 22 | 29 | 19 | 15 | 22 | 10 |
| secant modulus (MPa) | 110 | 81 | 106 | 64 | 95 | 69 |

***CN966J75 (Sartomer) aliphatic urethane acrylate oligomer is purchased as a mixture of oligomer and about 25% IBOA

Examples 3–7

Radiation-curable compositions were prepared by conventional methods according to the following formulations (parts by weight) in Table III and UV-cured.

TABLE III

| Components | 3 | 4 | 5 | 6 | 7 |
|---|---|---|---|---|---|
| CN973J75 (Sartomer) | 80 | 80 | 80 | | |
| CN966J75 (Sartomer) | | | | 80 | |
| BR-7432* (Bomar Specialties Co.) | | | | | 60 |
| Vinyl caprolactam | | 12 | | | |
| N-Vinylformamide | 12 | | 12 | 12 | 12 |
| isobornyl acrylate | 4 | 4 | 4 | 4 | 24 |
| LUCIRIN TPO | 4 | 4 | 4 | 4 | 4 |
| γ-mercapto propyl trimethoxy silane | | 3 | 3 | 3 | 3 |
| Mercaptobenz-thiazole | 3 | | | | |
| tensile strength (MPa) | 27 | 17 | 11 | 13 | 25 |
| elongation at break (%) | 360 | 434 | 624 | 655 | 639 |
| secant modulus (MPa) | 71 | 7 | 3 | 48 | 98 |

*BR-7432 is a high elongation unsaturated aliphatic urethane acrylate oligomer.

Each of the compositions, despite comprising several different oligomers, exhibited, after cure, high elongation in particular and good mechanical properties in general. The aliphatic mercapto compound showed to be much more effective than the aromatic mercapto of example 3. Examples 3 and 5 can be compared with comparison experiment C, Example 6 with comparison experiment D to show the effect of the elongation promotor.

Examples 8–11

Compositions were prepared by conventional means according to the following formulations (parts by weight) in Table IV and radiation-cured by conventional means. The data demonstrated that all compositions according to the present invention, after cure, had high elongation above 400%. For purpose of comparison, comparison experiment D is added to the table.

TABLE IV

| Component | D | 8 | 9 | 10 | 11 |
|---|---|---|---|---|---|
| CN966J75 (Sartomer) | 80 | 80 | 80 | 80 | 80 |
| NVF (N-vinyl formamide) | 12 | 12 | 12 | 12 | 12 |
| IBOA (isobornyl acrylate) | 4 | 4 | 4 | 4 | 4 |
| γ-mercaptopropyl trimethoxy silane | | | | | |
| bis(3-triethoxysilyl-propyl)tetrasulfide | | 3 | 6 | | |
| t-dodecyl mercaptan | | | | 3 | 6 |
| LUCIRIN TPO | 4 | 4 | 4 | 4 | 4 |
| tensile strength (MPa) | 22 | 9 | 3 | 17 | 9 |
| elongation to break (%) | 328 | 692 | 1266 | 562 | 669 |
| secant modulus (MPa) | 110 | 32 | 6 | 61 | 14 |

Examples 12–20 and Comparative Experiment C

A series of compositions were prepared as follows. A common base composition was formulated with varying amounts of γ-mercaptopropyltrimethoxy silane according to Table V by conventional means. The base composition was prepared from 80 parts by weight CN 973J75 oligomer, 12 parts by weight NVF, 4 parts by weight IBOA, and 4 parts by weight LUCIRIN (BASF). Elongation increased with increasing amounts of mercaptosilane compound.

TABLE V

| | C | 12 | 13 | 14 | 15 | 16 | 17 | 18 | 19 | 20 |
|---|---|---|---|---|---|---|---|---|---|---|
| additive* | 0 | 0.5 | 1 | 1.5 | 2 | 2.5 | 3 | 3.5 | 4.5 | 6 |
| elongation (%) | 328 | 381 | 451 | 489 | 502 | 538 | 542 | 563 | 615 | 714 |
| tensile strength (MPa) | 22 | 20 | 22 | 24 | 21 | 20 | 22 | 22 | 9.9 | 6.9 |
| secant modulus (MPa) | 110 | 95 | 88 | 83 | 81 | 81 | 79 | 87 | 40 | 25.5 |

*amount of γ-mercaptopropyltrimethoxy silane (wt. %)

Examples 21–23 and Comparative experiments J and K

Radiation-curable compositions were prepared by conventional methods according to the following formulations (parts by weight) in Table VI and UV-cured.

TABLE VI

| Components | 21 | J | 22 | 23 | K |
|---|---|---|---|---|---|
| Sartomer (CN966J75) | 80 | 80 | 80 | 80 | 80 |
| vinyl caprolactam | 6 | 6 | | | |
| N-vinyl pyrrolidone | | | 12 | | |
| NBP* | | | | 12 | 12 |
| isobornyl acrylate | 10 | 10 | 4 | 4 | 4 |
| LUCIRIN TPO | 4 | 4 | 4 | 4 | 4 |
| γ-mercaptopropyl trimethoxy silane | 3 | — | 3 | 3 | — |
| tensile strength (MPa) | 17 | 16 | 16 | 63 | 11 |
| elongation at break (%) | 476 | 364 | 668 | 507 | 210 |
| secant modulus (MPa) | 20 | 43 | 8 | 15 | 19 |

*The adduct of N-vinylformamide to n-butylacrylate

Tensile Properties Test Methods

Equipment/Materials

The tensile properties of cured samples were tested using a universal testing instrument, Instron Model 4201 equipped with a suitable personal computer and Instron software to yield values of tensile strength, percent elongation at break, and secant or segment modulus. Load cells had 2 or 20 pound capacity, or metric equivalents.

Sample Preparation

A drawdown (cured film) of each material to be tested was made on a glass plate and cured using a UV processor. The cured film was conditioned at 23±2° C. and 50±5% relative humidity for a minimum of sixteen hours prior to testing. A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined with a micrometer. At least five measurements of film thickness were made in the area to be tested (from top to bottom) and the average value used for calculations. If any of the measured values of film thickness deviated from the average by more than 10% relative, the test specimen was discarded. Film width was also measured. All specimens came from the same plate, and generally, at least six strips were needed to obtain tensile properties.

Instrument Set-Up/Standardizatio

The appropriate load cell was determined by consideration of the following equation:

$$[A \times 145] \times 0.0015 = C$$

Where: A=a product's maximum expected tensile strength (MPa); 145=Conversion Factor from MPa to psi; 0.0015= approximate cross-sectional area (in$^2$) of test specimens; and C=lbs. The 2 pound load cell was used for materials where C=1.8 lbs. or less. The 20 pound load cell was used for materials where C was between 1.8 and 19 lbs. If C was higher than 19 lbs., a higher capacity load cell was required. Analogous steps were used for metric load cells.

The crosshead speed was set to 1.00 inch/min (or to a metric value equal to M the gauge length), and the crosshead action was set to "return at break." The crosshead was adjusted to 2.00 inches jaw separation. The air pressure for the pneumatic grips was turned on and adjusted as follows: set at approximately 20 psi (1.5 Kg/cm$^2$) for primary optical fiber coatings and other very soft coatings; set at approximately 40 psi (3 Kg/cm$^2$) for optical fiber single coats; and set at approximately 60 psi (4.5 Kg/cm$^2$) for secondary optical fiber coatings and other hard coatings. An appropriate Instron computer method was loaded for the coating to be analyzed.

After the Instron test instrument had been allowed to warm-up for fifteen minutes, it was calibrated and balanced following the manufacturers operating procedures. The temperature near the Instron Instrument was measured and the humidity was measured at the location of the humidity gage. This was done just before beginning measurement of the first test specimen.

Specimens were only analyzed if the temperature was within the range 23±2° C., and the relative humidity was within 50±5%. The temperature was verified as being within this range for each test specimen. The humidity value was verified only at the beginning and the end of testing a set of specimens from one plate.

Procedure for Measurement of a Stress-Strain Curve

Each test specimen was tested by suspending it into the space between the upper pneumatic grips such that the test specimen was centered laterally and hanging vertically. The upper grip (only) was locked. The lower end of the test specimen was pulled gently so that it has no slack or buckling, and it was centered laterally in the space between the open lower grips. While holding the specimen in this position, the lower grip was locked.

The sample number and sample dimensions were entered into the data system, following the instructions provided by the software package. Tensile measurement for the sample was then executed with the Instron device. This was repeated for additional specimens.

The temperature and humidity were measured after the last test specimen from the current drawdown was tested.

Calculations

The calculation of tensile properties was performed automatically by the software package. The values for tensile strength, % elongation, and secant modulus were checked to determine whether any one of them deviated from the average enough to be an "outlier." If necessary, the procedure was repeated.

While the invention has been described in detail and with reference to specific embodiments thereof, it will be apparent to those of ordinary skill in the art that various changes and modifications can be made therein without departing from the spirit and scope thereof.

Dry and Wet Adhesion Test Method

The wet and dry adhesion can be tested on cured film samples prepared by drawing down, with a Bird Bar, a 75 micron film of the coating compositions on glass microscope slides and cured by exposure to 1.0 J/cm$^2$, from a Fusion D lamp, 120 W/cm, under a nitrogen atmosphere.

The samples are then conditioned at a temperature of 23±2° C. and a relative humidity of 50±5% for a time period of 7 days. A portion of the film is utilized to test dry adhesion. Subsequent to dry adhesion testing, the remainder of the film to be tested for wet adhesion is further conditioned at a temperature of 23±2° C. and a relative humidity of 95% for a time period of 24 hours. A layer of polyethylene wax/water slurry was applied to the surface of the further conditioned film to retain moisture.

The adhesion values are measured with a universal testing instrument, e.g., an Instron Model 4201 commercially available from Instron Corp., Canton, Mass., and a device, including a horizontal support and a pulley, positioned in the testing instrument.

After conditioning, the samples that appeared to be uniform and free of defects are cut, in the direction of the drawdown, into 6 inch long and 1 inch wide strips (free of tears or nicks). The first one inch of each sample is peeled back from the glass. The glass is secured to the horizontal support with the affixed end of the speciment adjacent the pulley. A wire is attached to the peeled-back end of the sample, run along the specimen and then run through the pulley in a direction perpendicular to the speciment. The free end of the wire is clamped in the upper jaw of the testing instrument which is then activated. The test is continued until the average force value, in grams force/inch, became relatively constant.

Alcohol Extraction Test Method

Samples of the cured composition are weighed and then submerged in an ethyl alcohol solution. After 24 hours, the samples are dried and re-weighed. The weight percent extracted, relative to the total weight of the initial sample, is determined from these values.

What is claimed is:

1. A radiation-curable composition comprising the folowing pre-mixture components:

a) a polymer, oligomer, or monomer having at lease one (meth)acrylate functional group;

b) an oligomer or monomer, exclusive of (meth)acrylate functional groups, having an ethylenically unsaturated functional group;

c) an elongation promoter comprising a mercapto or sulfide group; and d) a photoinitiator; wherein the composition, after ratiation cure, has an elongation at break of at least about 400%; and said elongation promoter is present in an amount sufficient to result in an elongation that is at least 1.5 times the elongation of a corresponding composition that does not comprise the elongation promoter.

2. The radiation-curable composition according to claim 1, wherein the component (b) is present in an amount of from 3–20 wt. %, relative to the total composition.

3. The radiation-curable composition according to claim 1, wherein the ethylenically-unsaturated functional group includes a N-vinyl group.

4. The radiation-curable composition according to claim 1, wherein the ethylenically-unsaturated functional oligomer or monomer is N-vinyl formamide, N-vinyl pyrrolidone or N-vinyl caprolactam.

5. The radiation-curable composition according to claim 1, wherein the oligomer or monomer component (b) is monofunctional.

6. The radiation-curable composition according to claim 1, wherein the component (a) includes a (meth) acrylurethane polymer, oligomer or monomer.

7. The radiation-curable composition according to claim 1, wherein the component (a) has two (meth)acrylate functional groups.

8. The radiation-curable composition according to claim 1, wherein the component (a) is a (meth)acrylurethane polymer or oligomer having a polyether, polycarbonate or hydrocarbon backbone.

9. The radiation-curable composition according to claim 1, wherein the components (a) and (b) do not contain a silicone group.

10. The radiation-curable composition according to claim 1, wherein the composition is free of difunctional monomers.

11. The radiation-curable composition according to claim 1, wherein the sulfur-containing compound has a sulfur atom attached to an aliphatic group.

12. The radiation-curable composition according to claim 1, wherein the elongation promoter includes a silane group.

13. The radiation-curable composition according to claim 1, wherein the composition comprises, relative to the total composition, about 0.5 to about 8 wt. % of the elongation promoter.

14. The radiation-curable composition according to claim 1, wherein said photoinitiator is present in an amount sufficient to accelerate curing of the composition upon exposure to ultra-violet and/or visible light.

15. An article comprising a coating, binder, or adhesive formed from a composition according to claim 1.

16. The article of claim 15, wherein the article is a coated optical fiber.

17. The article of claim 15, wherein the article is a sewing thread.

18. The article of claim 15, wherein the article is a multi-layered glass.

19. A process for making an article comprising a cured coating, binder or adhesive comprising, the steps of:

applying to a substrate a composition according to claim 1, and curing the composition.

20. The process of claim 19, further comprising the step of curing the composition by exposure to 0.2 to 2.0 J/cm$^2$ of ultraviolet and/or visible light.

21. The composition of claim 1, wherein said composition, after radiation cure, has an elongation at break of at least about 600%.

22. The composition of claim 1, wherein said composition, after radiation cure, has an elongation at break of at least about 800%.

23. The composition of claim 1, wherein said composition, after radiation cure, has a secant modulus of at least about 3 MPa.

24. The composition of claim 1, wherein said composition, after radiation cure, has a secant modulus of at least about 10 MPa.

25. The composition of claim 1, wherein said composition, after radiation cure, has a secant modulus of at least about 3 MPa and less than about 70 MPa.

26. The composition of claim 1, wherein said composition, after radiation cure, has a dry adhesion of above 300 g/inch.

27. The composition of claim 1, wherein said composition, after radiation cure, has a wet adhesion of above 150 g/inch.

28. The composition of claim 1, wherein said composition, after cure, has an alcohol extraction value that does not exceed 8 wt %.

29. The composition of claim 1, wherein said composition comprises, relative to the total weight of the composition, 5 to 8 wt % of elongation promoter.

30. The composition of claim 1, comprising, relative to the total weight of the composition, less than 14 wt % of said component (b).

* * * * *